United States Patent
Zhu

(10) Patent No.: US 12,499,640 B2
(45) Date of Patent: Dec. 16, 2025

(54) SCENE ELEMENT PROCESSING METHOD AND APPARATUS, DEVICE, AND MEDIUM

(71) Applicant: Tencent Technology (Shenzhen) Company Limited, Shenzhen (CN)

(72) Inventor: Zhixiu Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 195 days.

(21) Appl. No.: 18/238,413

(22) Filed: Aug. 25, 2023

(65) Prior Publication Data

US 2023/0401806 A1 Dec. 14, 2023

Related U.S. Application Data

(63) Continuation of application No. PCT/CN2022/137148, filed on Dec. 7, 2022.

(30) Foreign Application Priority Data

Mar. 18, 2022 (CN) .......................... 202210267179.1

(51) Int. Cl.
   *G06T 19/20* (2011.01)
   *A63F 13/52* (2014.01)
   (Continued)

(52) U.S. Cl.
   CPC .............. *G06T 19/20* (2013.01); *A63F 13/52* (2014.09); *G06T 3/40* (2013.01); *G06T 7/20* (2013.01);
   (Continued)

(58) Field of Classification Search
   CPC ....... A63F 13/52; G06T 13/60; G06T 15/005; G06T 17/00; G06T 17/05; G06T 17/20; G06T 19/20
   See application file for complete search history.

(56) References Cited

U.S. PATENT DOCUMENTS

2008/0238919 A1 10/2008 Pack
2022/0143509 A1* 5/2022 Griesemer .............. A63F 13/60

FOREIGN PATENT DOCUMENTS

CN 108543311 A 9/2018
CN 112245926 A 1/2021
(Continued)

OTHER PUBLICATIONS

Torres do Nascimento et al., GPU-Based Real-Time Procedural Distribution of Vegetation on Large-Scale Virtual Terrains, 2018 17th Brazilian Symposium on Computer Games and Digital Entertainment, Nov. 2018, pp. 157-166 (Year: 2018).*

(Continued)

*Primary Examiner* — Charles Tseng
(74) *Attorney, Agent, or Firm* — Morgan, Lewis & Bockius LLP

(57) ABSTRACT

This application relates to a scene element processing method performed by a computer device. The method includes: displaying a virtual scene including a target region; in response to a scene element update operation on the target region, acquiring scene element density distribution information corresponding to the target region; determining element density values corresponding to candidate positions in the target region based on the scene element density distribution information; and rendering a scene element at an element generation position determined from the candidate positions based on the element density values.

16 Claims, 9 Drawing Sheets

(51) Int. Cl.
    *G06T 3/40*     (2006.01)
    *G06T 7/20*     (2017.01)
    *G06V 10/25*     (2022.01)

(52) U.S. Cl.
    CPC .... *G06V 10/25* (2022.01); *G06T 2207/30242* (2013.01); *G06T 2219/2004* (2013.01)

(56) References Cited

FOREIGN PATENT DOCUMENTS

| CN | 112587921 A | 4/2021 |
|----|-------------|--------|
| CN | 114344894 A | 4/2022 |

OTHER PUBLICATIONS

Onrust et al., Procedural Generation and Interactive Web Visualization of Natural Environments, Web3D '15: Proceedings of the 20th International Conference on 3D Web Technology, Jun. 2015, pp. 133-141 (Year: 2015).*

Deussen et al., Realistic Modeling and Rendering of Plant Ecosystems, SIGGRAPH '98: Proceedings of the 25th Annual Conference on Computer Graphics and Interactive Techniques, Jul. 1998 (Year: 1998).*

Raffe et al., Integrated Approach to Personalized Procedural Map Generation Using Evolutionary Algorithms, IEEE Transactions on Computational Intelligence and AI in Games, vol. 7, No. 2, Jun. 2015, pp. 139-155 (Year: 2015).*

Zhang et al., Example-based Rapid Generation of Vegetation on Terrain via CNN-based Distribution Learning, The Visual Computer, vol. 35, May 2019, pp. 1181-1191 (Year: 2019).*

Niese et al, Procedural Urban Forestry, ACM Transactions on Graphics, vol. 41, No. 2, Article 20, Feb. 2022 (Year: 2022).*

Tencent Technology, ISR, PCT/CN2022/137148, Mar. 1, 2023, 2 pgs.

\* cited by examiner

SCENE ELEMENT PROCESSING METHOD AND APPARATUS, DEVICE, AND MEDIUM

CROSS-REFERENCE TO RELATED APPLICATIONS N

This application is a continuation application of PCT Patent Application No. PCT/CN2022/137148, entitled "SCENE ELEMENT PROCESSING METHOD AND APPARATUS, DEVICE, AND MEDIUM" filed on Dec. 7, 2022, which claims priority to Chinese Patent Application No. 2022102671791, filed with the China National Intellectual Property Administration on Mar. 18, 2022, and entitled "SCENE ELEMENT PROCESSING METHOD AND APPARATUS, DEVICE, AND MEDIUM", all of which is incorporated herein by reference in its entirety.

FIELD OF THE TECHNOLOGY

This application relates to the field of rendering technologies, and in particular, to a scene element processing method and apparatus, a device, and a medium.

BACKGROUND OF THE DISCLOSURE

With the development of computer technologies, the scene element rendering technology appears. The scene element rendering technology is a technology of automatically rendering to generate a scene element in a virtual scene based on a computer. The game field is used as an example. Scene elements in a game scene can be generated through the scene element rendering technology. For example, for a plant planting game, virtual plant objects in a plant planting game scene can be generated through the scene element rendering technology.

In the conventional technologies, scene elements are usually generated individually or in a cell form. However, the distribution of the scene elements generated individually or in the cell form is monotonously repeated, resulting in that the scene elements cannot be well integrated into the virtual scene, causing relatively poor rendering effects.

SUMMARY

In view of this, for the foregoing technical problem, it is necessary to provide a scene element processing method and apparatus, a device, and a medium.

According to a first aspect, this application provides a scene element processing method, performed by a computer device, the method including:

displaying a virtual scene including a target region;

in response to a scene element update operation on the target region, acquiring scene element density distribution information corresponding to the target region;

determining element density values corresponding to candidate positions in the target region based on the scene element density distribution information; and rendering a scene element at an element generation position determined from the candidate positions based on the element density values.

According to a second aspect, this application provides a computer device, including one or more memories and one or more processors, the memory storing computer-readable instructions that, when executed by the one or more processors, when executing the computer-readable instructions, cause the computer device to implement the steps in the method embodiments of this application.

According to a third aspect, this application provides one or more non-transitory computer-readable storage media that, the computer-readable instructions, when executed by one or more processors of a computer device, cause the computer device to implement the steps in the method embodiments of this application.

Details of one or more embodiments of this application are provided in the subsequent accompanying drawings and descriptions. Other features, objectives, and advantages of this application are illustrated in the specification, the accompanying drawings, and the claims.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
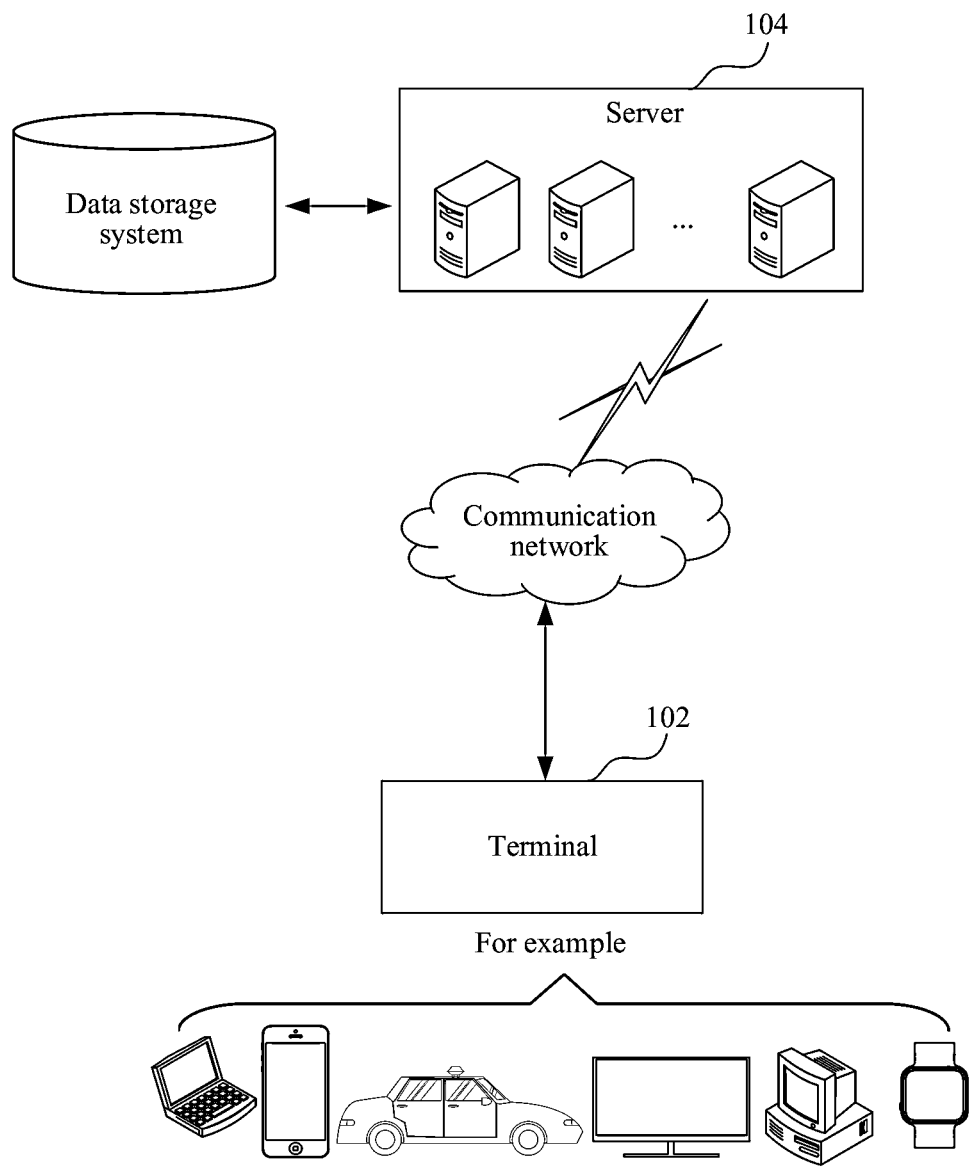
FIG. 1 is a diagram of an application environment of a scene element processing method according to an embodiment.

The scene element processing method provided in this application may be applied to the application environment shown in FIG. 1. A terminal 102 communicates with a server 104 through a network. A data storage system may store data that needs to be processed by the server 104. The data storage system may be integrated on the server 104, or placed on the cloud or another server. The terminal 102 may be, but not limited to, any desktop computer, notebook computer, smartphone, tablet computer, Internet of Things device, and portable wearable device. The Internet of Things device may be a smart speaker, a smart television, a smart air conditioner, a smart in-vehicle device, or the like. The portable wearable device may be a smart watch, a smart band, a head-mounted device, or the like. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be directly or indirectly connected in a wired or wireless communication manner. This is not limited in this application.

The terminal 102 may display a target region on which scene element rendering processing is to be performed in a virtual scene. The terminal 102 may acquire scene element density distribution information corresponding to the target region in response to a scene element update operation on the target region, the scene element density distribution information being used for indicating a distribution of at least one to-be-generated scene element in the target region. The terminal 102 may determine element density values corresponding to candidate positions in the target region based on the scene element density distribution information. The terminal 102 may determine an element generation position from the candidate positions based on the element density values, and perform rendering to generate a corresponding scene element at the element generation position.

It may be understood that, the terminal 102 may acquire relevant data of a target region on which scene element rendering processing is to be performed in the virtual scene from the server 104, and then the terminal 102 may display, based on the acquired relevant data, the target region on which scene element rendering processing is to be performed in the virtual scene. It may be further understood that, after performing rendering to generate a corresponding scene element at the element generation position, the terminal 102 may synchronize the scene element generated through the rendering to the server 104.

Figure 2:
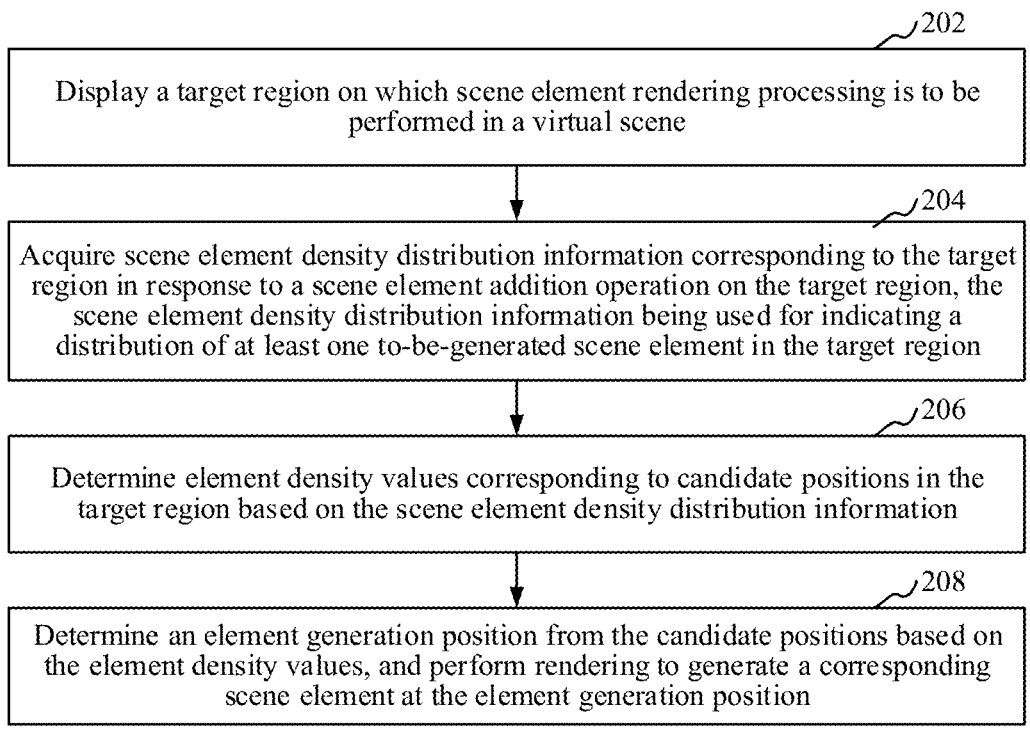
FIG. 2 is a schematic flowchart of a scene element processing method according to an embodiment.

In an embodiment, as shown in FIG. 2, a scene element processing method is provided. The method may be applied to the terminal 102 in FIG. 1, and is independently performed by the terminal 102, or may be implemented through interaction between the terminal 102 and the server 104. This embodiment is described by using an example in which the method is applied to the terminal 102 in FIG. 1. The method includes the following steps:

Step 202: Display a target region on which scene element rendering processing is to be performed in a virtual scene.

The virtual scene is a fictional scene. It may be understood that, the virtual scene is a non-real scene, for example, a scene in a game. The scene element is a component element in the virtual scene. For example, for a scene in a game, a virtual scene element may be at least one of a virtual character, a virtual animal, a virtual plant, a virtual prop, or the like in the game. The scene element rendering processing is a processing manner of rendering to generate a scene element. The target region is a region on which scene element rendering processing is to be performed in the virtual scene. It may be understood that, the virtual scene may include at least one region, and the target region is a region on which scene element rendering processing is to be performed in the at least one region of the virtual scene.

In an embodiment, the virtual scene may include at least one of a scene in a game, a visual design scene, a virtual reality (VR) scene, or the like.

Specifically, the virtual scene may include at least one region, and the terminal may determine, in response to a selection operation on the at least one region and from the at least one region of the virtual scene, a target region on which scene element rendering processing is to be performed. Further, the terminal may display the target region on which scene element rendering processing is to be performed in the virtual scene.

Step 204: Acquire scene element density distribution information corresponding to the target region in response to a scene element update operation on the target region, the scene element density distribution information being used for indicating a distribution of at least one to-be-generated scene element in the target region.

The scene element update operation is an operation of adding a scene element in the target region. It may be understood that, before the scene element update operation is performed, in the target region, there may be no corresponding scene element generated through rendering, or a corresponding scene element may have been generated through rendering. If there is no corresponding scene element generated through rendering in the target region before the scene element update operation is performed, a corresponding scene element may be newly added in the target region by performing the scene element update operation. If a corresponding scene element has been generated through rendering in the target region before the scene element update operation is performed, then by performing the scene element update operation, a corresponding scene element may continue to be added in the target region, so that the quantity of scene elements in the target region is greater than the quantity of scene elements in the target region before the scene element update operation is performed. The scene element density distribution information includes a plurality of element density values. The element density value is used for representing a density value of scene elements after the scene element update operation is performed. The density value refers to the quantity of scene elements generated through rendering per unit area.

Specifically, the user may perform a scene element update operation in the target region, and the terminal may update, in response to the user's scene element update operation on the target region, initial scene element density distribution information corresponding to the target region before the scene element update operation is performed, to obtain updated scene element density distribution information corresponding to the target region.

In an embodiment, the target region is covered by an element density recording layer. The user may perform a scene element update operation on the element density recording layer covering on the target region, and the terminal may acquire scene element density distribution information corresponding to the target region in response to the user's scene element update operation on the element density recording layer. The element density recording layer is an information recording layer for recording scene element density distribution information corresponding to the target region.

Step 206: Determine element density values corresponding to candidate positions in the target region based on the scene element density distribution information.

The candidate position is a position in the target region that has a certain probability of rendering to generate a corresponding scene element. It may be understood that, scene elements can only be generated through rendering at the candidate positions in the target region, and will not be generated through rendering at other positions than the candidate positions in the target region.

Specifically, the scene element density distribution information may include element density values. The terminal may determine the element density values corresponding to the candidate positions in the target region based on the element density values in the scene element density distribution information.

In an embodiment, the target region is covered by an element density recording layer, and element density values are recorded in the element density recording layer. For each candidate position in the target region, the terminal may perform upsampling in the element density recording layer based on the candidate position, and determine an element density value corresponding to the candidate position based on an element density value obtained through the upsampling.

In the foregoing embodiments, by covering the element density recording layer on the target region and performing upsampling in the element density recording layer based on each candidate position in the target region, the element density value corresponding to each candidate position in the target region can be quickly and accurately determined, which improves the acquisition efficiency and the accuracy of the element density values corresponding to the candidate positions.

In an embodiment, the terminal may perform upsampling in the element density recording layer based on the candidate position, and directly use an element density value obtained through the upsampling as an element density value corresponding to the candidate position.

Step 208: Determine an element generation position from the candidate positions based on the element density values, and perform rendering to generate a corresponding scene element at the element generation position.

The element generation position is a position in the target region used for rendering to generate a scene element.

Specifically, among the candidate positions in the target region, there may be candidate positions at which scene elements can be generated through rendering, and some candidate positions at which scene elements cannot be generated through rendering. It may be understood that, a candidate position at which a scene element can be generated through rendering is an element generation position. Based on the element density values corresponding to the candidate positions in the target region, the terminal may determine, from the candidate positions, an element generation position at which a scene element can be generated through rendering, and perform rendering to generate a corresponding scene element at the element generation position.

In an embodiment, the terminal may compare the element density values corresponding to the candidate positions with a preset element density threshold, and determine a candidate position of which the element density value is greater than the preset element density threshold as the element generation position. Further, the terminal may perform rendering to generate a corresponding scene element at the element generation position. In this way, by comparing the element density values respectively corresponding to the candidate positions with the preset element density threshold, the element generation position can be quickly determined, thereby improving the generation efficiency of scene elements.

In the foregoing scene element processing method, by displaying the target region on which scene element rendering processing is to be performed in the virtual scene, scene element density distribution information corresponding to the target region may be acquired in response to a scene element update operation on the target region, where the scene element density distribution information may be used for indicating a distribution of at least one to-be-generated scene element in the target region. The element density values corresponding to the candidate positions in the target region may be determined based on the scene element density distribution information, then an element generation position may be determined from the candidate positions based on the element density values, and rendering is performed to generate a corresponding scene element at the element generation position. Compared with the conventional manner of generating scene elements individually or in a cell form, in the scene element processing method of this application, by performing a scene element update operation on the target region, the scene element density distribution information corresponding to the target region can be updated in a personalized manner, to increase the element density value of the to-be-generated scene element in the target region, and then the element generation position can be determined from the candidate positions in the target region based on the updated scene element density distribution information, and rendering can be performed to generate a corresponding scene element at the element generation position. In this way, by modifying the element density value of the to-be-generated scene element in the target region, a square sense and a boundary sense can be avoided. In addition, the density of the generated scene elements in the target region is controllable, which can provide a more natural transition between the scene elements, and can further avoid the monotonously repeated distribution of the generated scene elements, so that the scene elements can be better integrated into the virtual scene, thereby improving the rendering effects.

Figure 3:
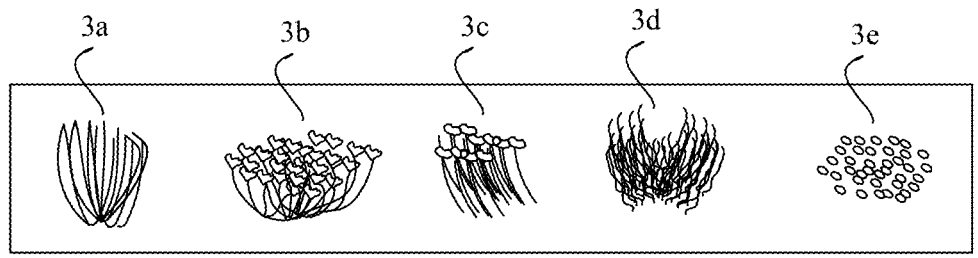
FIG. 3 is a schematic diagram of generating a scene element by using a cell as a unit in a conventional scene element generation method.
Figure 4:
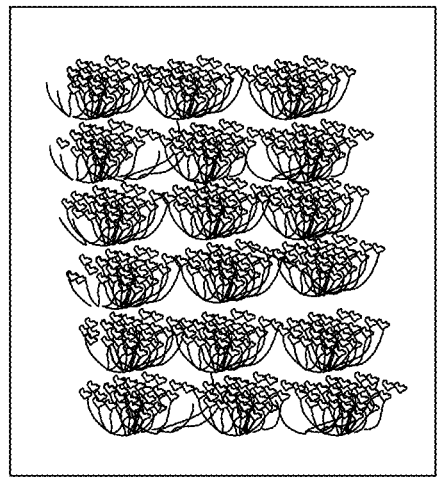
FIG. 4 is a schematic diagram of a scene element distribution effect of generating a scene element by using a cell as a unit in a conventional scene element generation method.

It may be understood that, in the conventional manner of generating scene elements, as shown in FIG. 3, scene elements 3a, 3b, 3c, 3d, and 3e are all generated in units of cells, and an element density value of a scene element in each cell is fixed. However, by generating scene elements in units of cells, the distribution of generated scene elements will be monotonically repeated. As shown in FIG. 4, the scene element 3b is used as an example. The scene elements generated through rendering in the target region present a monotonously repeated distribution, resulting in that the scene elements cannot be well integrated into the virtual scene. However, in the scene element processing method of this application, by performing a scene element update operation on the target region, the scene element density distribution information corresponding to the target region can be updated in a personalized manner, an element generation position can be determined from the candidate positions of the target region based on the updated scene element density distribution information, and rendering can be performed to generate a corresponding scene element at the element generation position, which can avoid the monotonously repeated distribution of the generated scene elements, and make the scene elements be better integrated into the virtual scene, thereby improving the rendering effects.

In an embodiment, the target region is covered by a mask image; pixel values of pixel points in the mask image are used for representing the scene element density distribution information; and the scene element update operation includes a pixel value modification operation, the pixel value modification operation being used for modifying a pixel value of a pixel point in the mask image; and the acquiring scene element density distribution information corresponding to the target region in response to a scene element update operation on the target region includes: updating the pixel value of the pixel point in the mask image in response to the pixel value modification operation on the mask image covering on the target region, to obtain the scene element density distribution information corresponding to the target region.

A mask image is an image that stores pixel values in a map manner, and pixel values of pixel points in the mask image can be edited in the map manner. It may be understood that, the element density recording layer includes a mask image. The scene element density distribution information includes a plurality of element density values, and the pixel values of the pixel points in the mask image are used for representing the scene element density distribution information. It may be understood that, the pixel values of the pixel points in the mask image have a mapping relationship with the element density values in the scene element density distribution information, and the pixel value of one pixel point corresponds to one element density value. It may be understood that, the pixel value of the pixel point in the mask image may be used for representing the element density value of the to-be-generated scene element.

Specifically, the user may perform a pixel value modification operation on the mask image covering on the target region, and the terminal may update the original pixel value of the corresponding pixel point in the mask image in response to the user's pixel value modification operation on the mask image covering on the target region, to obtain an updated pixel value of the corresponding pixel point. The terminal may determine the scene element density distribution information corresponding to the target region based on the updated pixel value of the corresponding pixel point.

In an embodiment, the pixel value modification operation may be implemented through a selection operation on the pixel points in the mask image. The terminal may determine, in response to the selection operation on the pixel points in the mask image, a pixel region selected on the mask image. The terminal may modify pixel values of pixel points in the pixel region, to obtain the scene element density distribution information corresponding to the target region based on the pixel values of the pixel points in a modified mask image. The pixel region is a region in which pixel points selected based on the selection operation on the pixel points in the mask image are located. In this way, a to-be-modified pixel region is determined through the selection operation on the pixel points in the mask image, thereby providing a flexible and quick manner of determining a pixel region. Further, by modifying the pixel values of the pixel points in the pixel region, targeted control on generation through rendering of scene elements is implemented, thereby improving the rendering effects.

In the foregoing embodiments, by covering the mask image on the target region, and by representing the scene element density distribution information through the pixel values of the pixel points in the mask image, the scene element density distribution information corresponding to the target region can be quickly obtained by updating the pixel values of the pixel points in the mask image, thereby improving the efficiency of acquiring the scene element density distribution information.

In an embodiment, the target region is covered by at least one mask image; the target region supports rendering to generate a scene element of at least one element type; a quantity of mask images covering on the target region is the same as a quantity of element types supported by the target region; and one mask image corresponds to one element type.

It may be understood that, there may be a plurality of element types of scene elements. For each element type, scene elements of this element type can be controlled through a mask image corresponding to the element type. That is, the scene element density distribution information of scene elements belonging to this element type is recorded through the mask image corresponding to the element type. The mask images corresponding to various element types are independent of each other and do not affect each other.

For example, the target region is covered by three mask images, which are a mask image A, a mask image B, and a mask image C respectively. The three mask images may belong to an element type a, an element type b, and an element type c respectively. Specifically, the mask image A is used for recording scene element density distribution information of scene elements belonging to the element type a, the mask image B is used for recording scene element density distribution information of scene elements belonging to the element type b, and the mask image C is used for recording scene element density distribution information of scene elements belonging to the element type c.

In the foregoing embodiments, by covering at least one mask image on the target region, and each mask image corresponds to one element type, scene elements of different element types can be respectively independently generated through rendering in the target region, thereby enriching the element types of the scene elements generated through rendering in the target region.

In an embodiment, the pixel value modification operation is implemented by controlling a virtual tool to move on the mask image; and the updating the pixel value of the pixel point in the mask image in response to the pixel value modification operation on the mask image covering on the target region, to obtain the scene element density distribution information corresponding to the target region includes: determining a movement region of the virtual tool on the mask image in response to an operation of controlling the virtual tool to move on the mask image, the movement region being a region that the virtual tool passes through when moving on the mask image; and modifying pixel values of pixel points in the movement region, to obtain the scene element density distribution information corresponding to the target region based on the pixel values of the pixel points in a modified mask image.

The virtual tool is a drawing tool in the virtual scene. That is, the virtual tool may be provided in the virtual scene for operation. It may be understood that, controlling the movement of the virtual tool on the mask image is one of implementation for implementing the selection operation on the pixel points in the mask image. By controlling the virtual tool to move on the mask image, the pixel values of the pixel points in the movement region can be modified. That is, the virtual tool is a tool that modifies the pixel value of each point on the mask image through movement to perform rendering to generate a scene element.

Specifically, the user may control the virtual tool to move on the mask image, and the terminal may determine, in response to the operation of controlling the virtual tool to move on the mask image, the movement region that the virtual tool passes through when moving on the mask image. The terminal may modify the pixel values of the pixel points in the movement region to obtain the pixel values of the pixel points in the modified mask image. Further, the terminal may determine the scene element density distribution information corresponding to the target region based on the pixel values of the pixel points in the modified mask image.

In an embodiment, the size of the range of the virtual tool may be changed. It may be understood that, a larger range of the virtual tool indicates a larger movement region that the virtual tool passes through when moving on the mask image, that is, a larger quantity of pixel points in the movement region that can be modified by the terminal, and a larger range in which scene elements can be generated through rendering at one time. a smaller range of the virtual tool indicates a smaller movement region that the virtual tool passes through when moving on the mask image, that is, a smaller quantity of pixel points in the movement region that can be modified by the terminal, and a smaller range in which scene elements can be generated through rendering at one time. In this way, by controlling the size of the range of the virtual tool, scene elements of different sizes of ranges can be generated through rendering at one time according to a requirement. Compared with the conventional manner of generating scene elements through rendering by particle or by cell, the operation of performing rendering to generate scene elements in this application is more convenient, and a large range of scene elements can be generated through rendering at one time.

Figure 5:
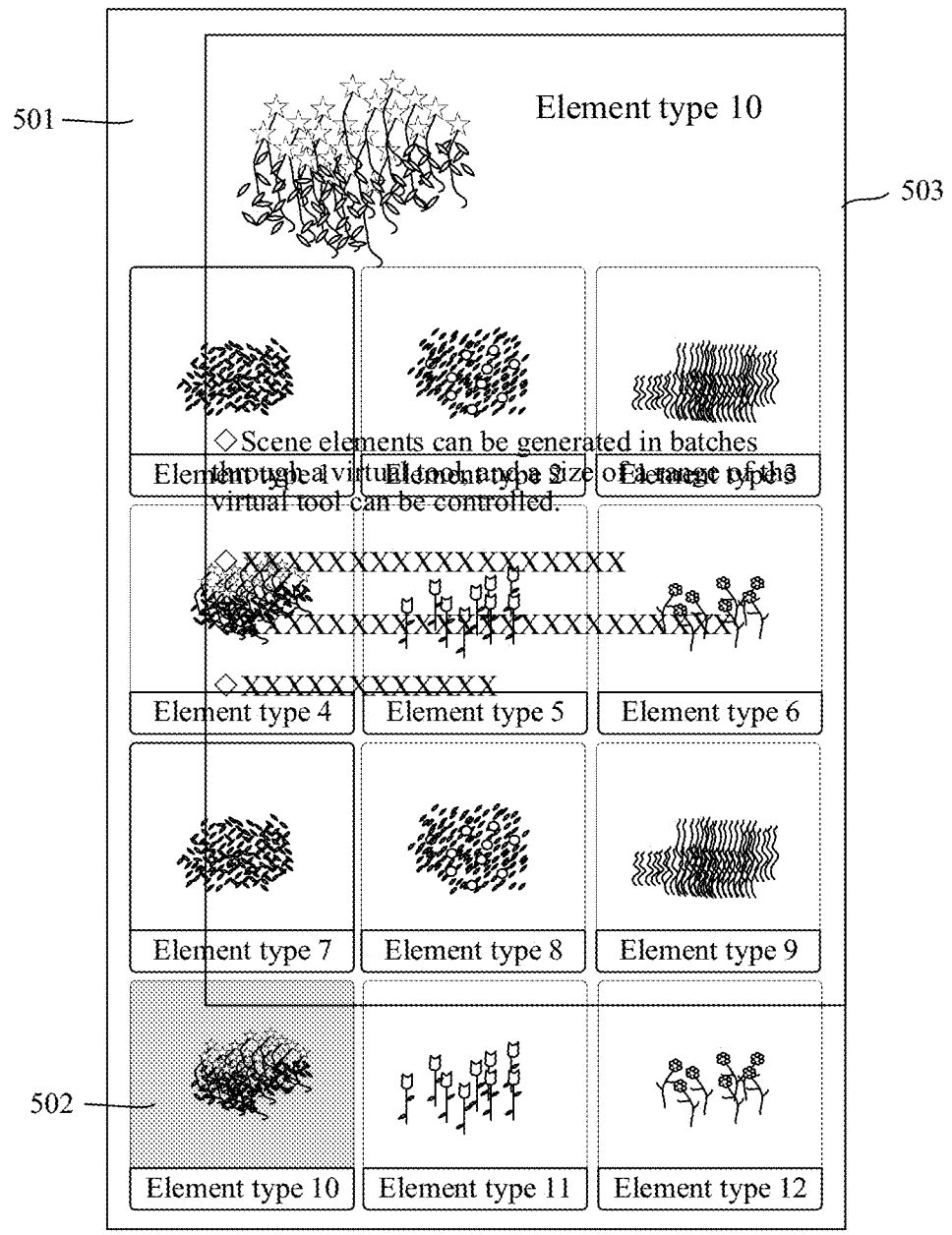
FIG. 5 is a schematic diagram of a virtual tool description interface according to an embodiment.

In an embodiment, as shown in FIG. 5, the terminal may display scene elements of various element types through a display interface 501, for example, element types 1 to 12 displayed on the display interface 501. After the element type is selected, the terminal may display the selected element type and related descriptions for the virtual tool through a virtual tool description interface 503, that is, "Scene elements can be generated in batches through a virtual tool, and a size of a range of the virtual tool can be controlled". For example, after the element type 10 is selected, the terminal may display the selected element type 10 and related descriptions for the virtual tool through the virtual tool description interface 503.

Figure 6:
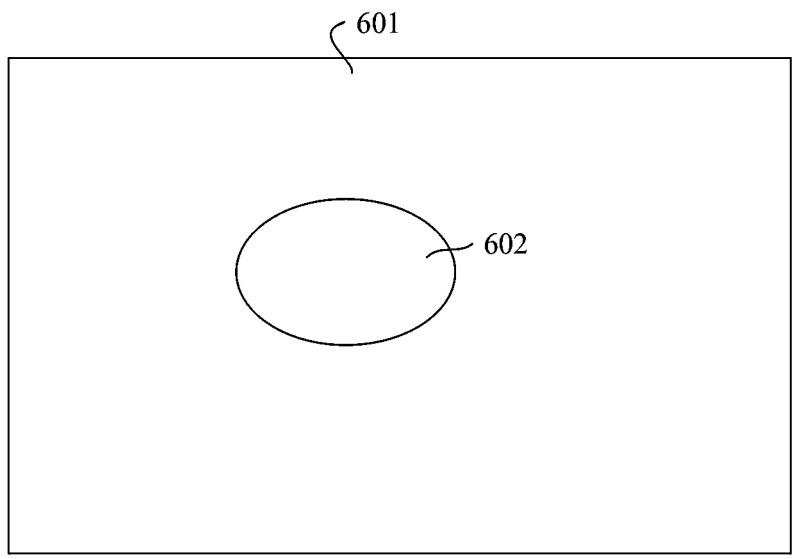
FIG. 6 is a schematic diagram of a movement region determined by controlling movement of a virtual tool according to an embodiment.

In an embodiment, as shown in FIG. 6, in response to an operation of controlling the virtual tool to move on a mask image 601, the terminal may determine a movement region 602 of the virtual tool on the mask image.

Figure 7:
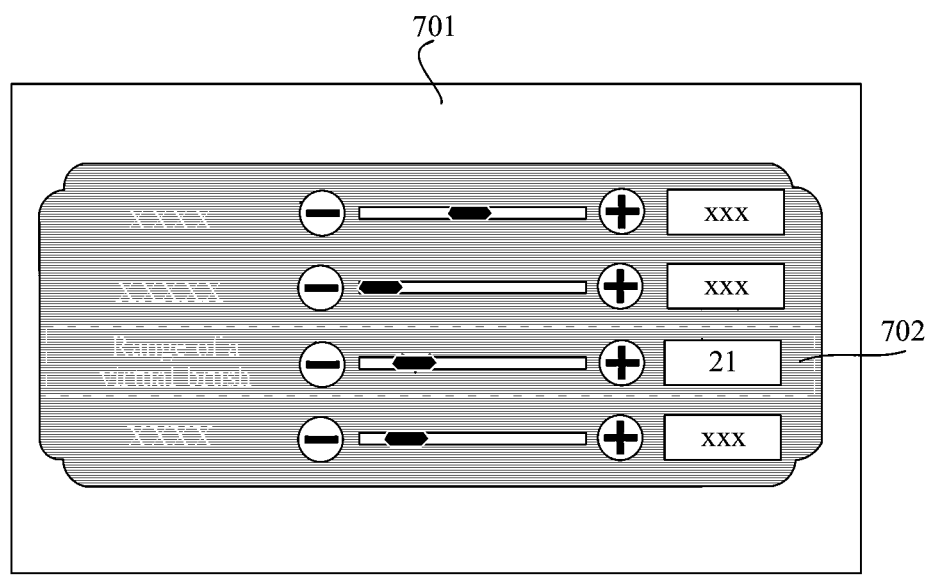
FIG. 7 is a schematic diagram of an adjustment interface of a size of a range of a virtual brush according to an embodiment.

In an embodiment, the virtual tool may be a virtual brush. As shown in FIG. 7, an example in which the virtual tool is a virtual brush is used. The terminal may display, through a brush range adjustment interface 701, a brush range adjustment control 702 for adjusting a size of a range of the virtual brush, and the terminal may adjust the size of the range of the virtual brush through a brush range adjustment control 702.

Figure 8:
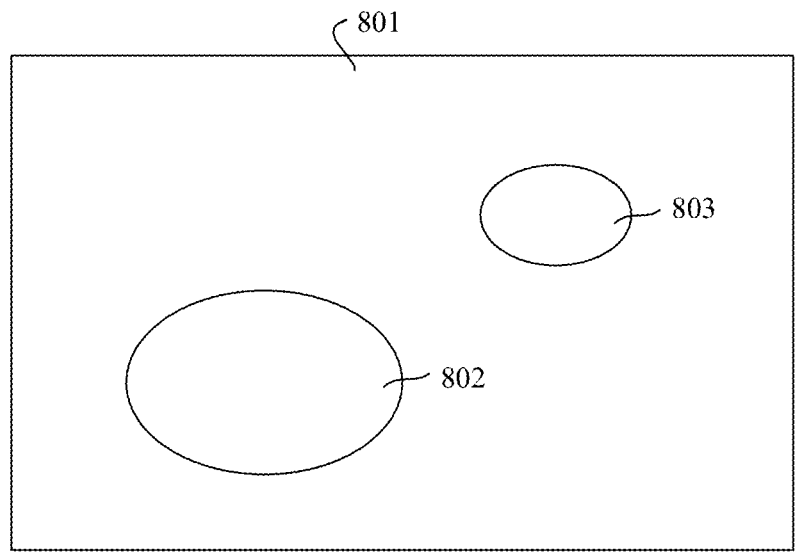
FIG. 8 is a schematic diagram of a movement region determined through a virtual brush with a large range and a movement region determined through a virtual brush with a small range according to an embodiment.

In an embodiment, as shown in FIG. 8, in response to an operation of controlling the virtual brush to move on the mask image 801, the terminal may determine a movement region 802 and a movement region 803 of the virtual brush on the mask image, where a virtual brush range corresponding to the movement region 802 is larger than a virtual brush range corresponding to the movement region 803, and an area of the movement region 802 is larger than an area of the movement region 803.

In the foregoing embodiments, the pixel values of the pixel points in the movement region are modified through an operation of controlling the virtual tool to move on the mask image, so as to control the generation through rendering of scene elements, thereby providing a new manner of generating scene elements through rendering, in which scene elements are generated through rendering by controlling the virtual tool, and the operation is more convenient.

In an embodiment, a first element density value is acquired, the first element density value being a maximum element density value corresponding to a target scene element type that supports rendering in the target region, the target scene element type being an element type to which the to-be-generated scene element belongs; a target quantity of the scene elements is determined according to the first element density value and a size of the target region; and candidate positions matching the target quantity is determined in the target region.

Specifically, the first element density value is a maximum element density value obtained by presetting and corresponding to a target scene element type that supports rendering in the target region. The terminal may acquire the preset first element density value corresponding to the target scene element type that supports rendering in the target region. The terminal may determine the target quantity of scene elements according to the first element density value and the size of the target region. Further, the terminal may determine candidate positions matching the target quantity in the target region.

In an embodiment, the terminal may determine the target quantity of the scene elements according to the first element density value and an area of the target region.

In an embodiment, the terminal may directly use a product of the first element density value and the area of the target region as the target quantity of the scene elements.

In the foregoing embodiments, the target quantity of the scene elements is determined according to the first element density value corresponding to the target scene element type that the target region supports rendering and the size of the target region, and candidate positions matching the target quantity are determined in the target region. In this way, different quantities of candidate positions are set in the target region according to scene elements of different element types, which improves the visual effect of performing rendering to generate scene elements in the target region.

In an embodiment, the target quantity of candidate positions in the target region may also be preset. The terminal may determine candidate positions matching the preset target quantity in the target region.

In an embodiment, the target region is covered by a mask image; and pixel values of pixel points in the mask image are used for representing the scene element density distribution information; and the determining element density values corresponding to candidate positions in the target region based on the scene element density distribution information includes: performing, for each candidate position in the target region, upsampling in the mask image based on the candidate position, and using a pixel value obtained through the upsampling as an element density value corresponding to the candidate position.

Upsampling is an image processing manner that increases the resolution of an image, and the resolution of the image can be increased by performing upsampling on the image. It may be understood that, through the upsampling, a pixel value of a lost pixel point in the image can be determined based on pixel values of the original pixel points of the image.

Specifically, for each candidate position in the target region, the terminal may perform upsampling in the mask image based on the candidate position. Further, the terminal may use a pixel value obtained by upsampling as the element density value corresponding to the candidate position. It may be understood that, the pixel value obtained by upsampling may be a pixel value of a pixel point in the mask image, or may be a new pixel value calculated based on the pixel values of the pixel points in the mask image.

In an embodiment, the upsampling may be implemented in a single linear interpolation sampling manner, and the upsampling may alternatively be implemented in a bilinear interpolation sampling manner. The manner of the upsampling is not specifically limited in this embodiment.

In the foregoing embodiments, by performing upsampling in the mask image based on the candidate position, and using a pixel value obtained through the upsampling as an element density value corresponding to the candidate position, the accuracy of the element density value corresponding to the candidate position can be improved.

In an embodiment, the performing, for each candidate position in the target region, upsampling in the mask image based on the candidate position, and using a pixel value obtained through the upsampling as an element density value corresponding to the candidate position includes: determining a mapping position in the mask image that has a mapping relationship with the candidate position; determining a plurality of target pixel points adjacent to the mapping position in the pixel points of the mask image; and determining a pixel value corresponding to the mapping position according to pixel values respectively corresponding to the plurality of target pixel points, to obtain the element density value corresponding to the candidate position.

The mapping position is a position in the mask image that has a mapping relationship with the candidate position in the target region. The target pixel point is a pixel point in the pixel points of the mask image and adjacent to the mapping position.

Specifically, for each candidate position, the terminal may determine a mapping position that has a mapping relationship with the candidate position in the mask image, and determine a plurality of target pixel points adjacent to the mapping position in the pixel points of the mask image. The terminal may acquire pixel values respectively corresponding to the plurality of target pixel points. Further, the terminal may determine a pixel value corresponding to the mapping position according to pixel values respectively corresponding to the plurality of target pixel points, and determine the element density value corresponding to the candidate position based on the pixel value corresponding to the mapping position.

In an embodiment, the terminal may directly use the pixel value corresponding to the mapping position as the element density value corresponding to the candidate position.

For example, the terminal may determine four target pixel points adjacent to the mapping position in the pixel points of the mask image. The terminal may acquire pixel values respectively corresponding to the four target pixel points. Further, the terminal may determine a pixel value corresponding to the mapping position according to the pixel values respectively corresponding to the four target pixel points.

In the foregoing embodiments, the pixel value corresponding to the mapping position can be determined according to the pixel values corresponding to the target pixel points adjacent to the mapping position, and the element density value corresponding to the candidate position can be determined according to the pixel value corresponding to the mapping position, which can further improve the accuracy of the element density value corresponding to the candidate position.

In an embodiment, the determining an element generation position from the candidate positions based on the element density values includes: respectively determining element generation probabilities corresponding to the candidate positions based on the element density values corresponding to the candidate positions, the element generation probabilities being probabilities of rendering to generate scene elements at the candidate positions; and determining the element generation position from the candidate positions according to the element generation probabilities corresponding to the candidate positions.

Specifically, the terminal may respectively determine, based on the element density values corresponding to the candidate positions, element generation probabilities of performing rendering to generate a scene element at the candidate positions. Further, the terminal may determine the element generation position from the candidate positions of the target region according to the element generation probabilities corresponding to the candidate positions.

In an embodiment, the terminal may respectively use the element density values corresponding to the candidate positions as the element generation probabilities of performing rendering to generate a scene element at the candidate positions.

In the foregoing embodiments, the element generation probabilities corresponding to the candidate positions can be respectively determined based on the element density values corresponding to the candidate positions, and the element generation position can be determined from the candidate positions according to the element generation probabilities corresponding to the candidate positions, which improves the accuracy of the determined element generation position.

In an embodiment, the respectively determining element generation probabilities corresponding to the candidate positions based on the element density values corresponding to the candidate positions includes: for each candidate position, acquiring a second element density value corresponding to the candidate position, the second element density value being a maximum element density value with which the candidate position supports rendering to generate the scene element; and determining the element generation probability corresponding to the candidate position based on a ratio of the element density value corresponding to the candidate position to the second element density value.

Specifically, for each candidate position, the terminal may acquire a second element density value with which the candidate position supports rendering to generate the scene element, and determine a ratio of the element density value corresponding to the candidate position to the second element density value. Further, the terminal may determine the element generation probability corresponding to the candidate position based on a ratio of the element density value corresponding to the candidate position to the second element density value.

In an embodiment, the terminal may directly use the ratio of the element density value corresponding to the candidate position to the second element density value as the element generation probability corresponding to the candidate position.

Figure 9:
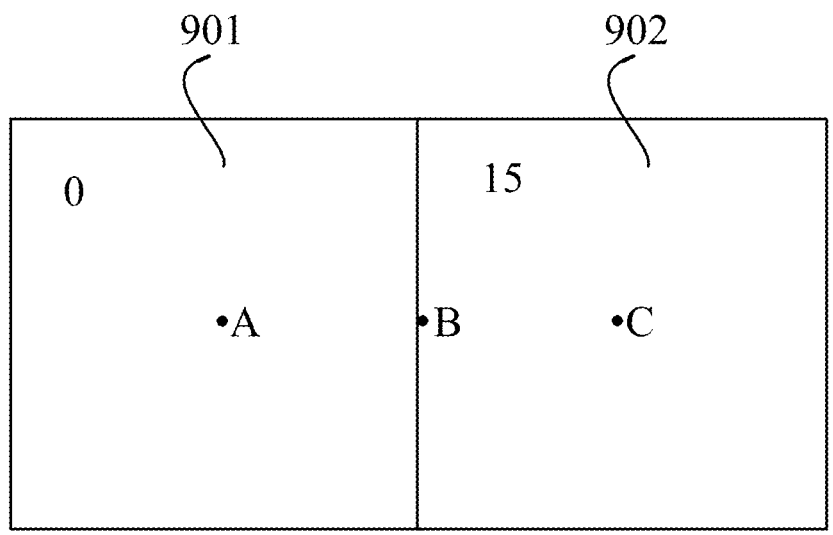
FIG. 9 is a schematic diagram of candidate positions in pixel points of a mask image according to an embodiment.

In an embodiment, if a value of the pixel value of each pixel point in the mask image ranges from 0 to 15, as shown in FIG. 9, among any two adjacent pixel points 901 and 902 in the mask image, the pixel value of the pixel point 901 is 0, and the pixel value of the pixel point 902 is 15. A candidate position A is located at the pixel center of the pixel point 901, and it can be seen that the pixel value of the candidate position A is the pixel value of the pixel point 901, that is, the pixel value of the candidate position A is 0; a candidate position C is located at the pixel center of the pixel point 902, and it can be seen that the pixel value of the candidate position C is the pixel value of the pixel point 902, that is, the pixel value of the candidate position C is 15; and a candidate position B is located between the pixel point 901 and the pixel point 902, and it can be seen that the pixel value of the candidate position B is an average value of the pixel value 0 of the pixel point 901 and the pixel value 15 of the pixel point 902, that is, the pixel value of the candidate position B is 7.5. It may be understood that, the element density value corresponding to the candidate position A is 0, the element density value corresponding to the candidate position B is 7.5, and the element density value corresponding to the candidate position C is 1. The terminal may directly use a ratio of the element density value corresponding to each candidate position to the maximum element density value 15 with which the candidate position supports rendering to generate the scene element as the element generation probability corresponding to the candidate position. It can be seen that the element generation probability corresponding to the candidate position A is 0, the element generation probability corresponding to the candidate position B is 0.5, and the element generation probability corresponding to the candidate position C is 1.

In the foregoing embodiments, the element generation probability corresponding to the candidate position can be determined based on the ratio of the element density value corresponding to the candidate position to the second element density value with which the candidate position supports rendering to generate the scene element, which improves the accuracy of the element generation probability.

In an embodiment, the method further includes: generating a random number corresponding to the target region; and the determining the element generation position from the candidate positions according to the element generation probabilities corresponding to the candidate positions includes: determining the element generation position from the candidate positions according to a magnitude relationship between the element generation probabilities corresponding to the candidate positions and the random number.

The random number is a value generated randomly and corresponding to the target region.

Specifically, the terminal may respectively compare the element generation probabilities corresponding to the candidate positions with the random number, to obtain a magnitude relationship between the element generation probabilities corresponding to the candidate positions and the random number. Further, the terminal may determine the element generation position from the candidate positions according to the magnitude relationship between the element generation probabilities corresponding to the candidate positions and the random number.

In an embodiment, the terminal may determine a candidate position of which the element generation probability is greater than or equal to the random number as the element generation position.

In the foregoing embodiments, the element generation position can be determined from the candidate positions based on the magnitude relationship between the element generation probabilities corresponding to the candidate positions and the random number. By increasing the random number, it can be prevented that scene elements are simultaneously generated or simultaneously not generated at a plurality of candidate positions with same element generation probabilities, thereby avoiding a repetition sense.

In an embodiment, the scene element density distribution information corresponding to the target region includes a plurality of element density values, and the method further includes: acquiring initial scene element density distribution information corresponding to the target region before the scene element update operation is performed, the initial scene element density distribution information including a plurality of initial element density values; respectively comparing the element density values in the scene element density distribution information with the initial element density values, to select an updated element density value from the element density values in the scene element density distribution information; and synchronizing the updated element density value to a server.

The initial element density value is used for representing a density value of scene elements before the scene element update operation is performed.

Specifically, the terminal may acquire initial scene element density distribution information corresponding to the target region before the scene element update operation is performed. The terminal may respectively compare the element density values in the scene element density distribution information with the initial element density values in the initial scene element density distribution information, and select an updated element density value from the element density values in the scene element density distribution information according to a comparison result. Further, the terminal may synchronize the updated element density value to a server, for the server to store the updated element density value. It may be understood that, the server has already stored the initial scene element density distribution information corresponding to the target region before the scene element update operation is performed. After receiving the updated element density value synchronized by the terminal, the server may search for, according to position coordinates corresponding to the updated element density value, the corresponding initial element density value in the initial scene element density distribution information, and modify the found corresponding initial element density value to the updated element density value.

In the foregoing embodiments, by respectively comparing the element density values in the scene element density distribution information with the initial element density values, an updated element density value can be selected from the element density values in the scene element density distribution information. In the incremental update manner, only the updated element density value is synchronized to the server, and compared with the conventional data update manner of sending the full quantity of element density values to the server, the incremental update manner of this application reduces the data volume of each synchronization, thereby improving the data update efficiency.

Figure 10:
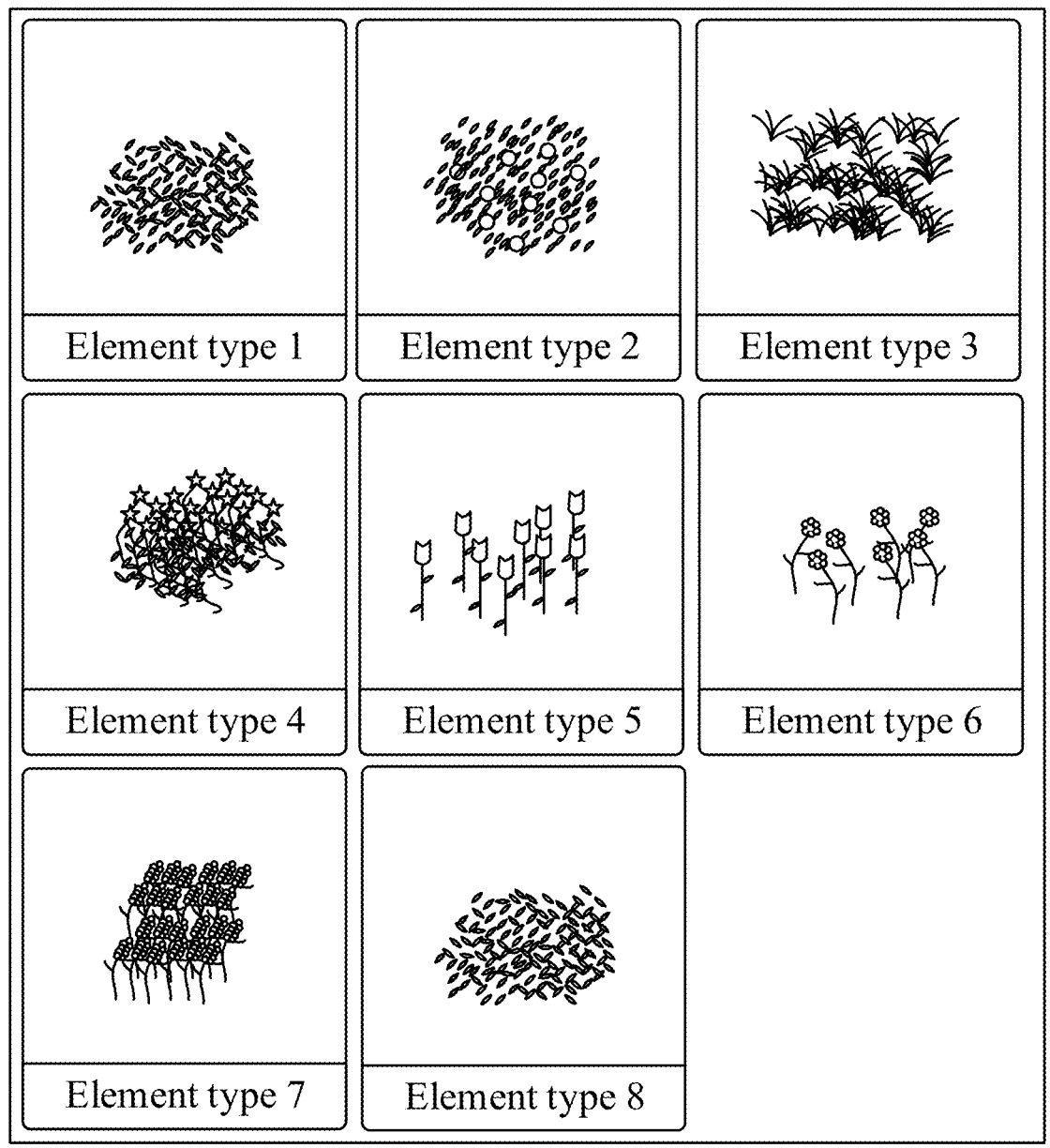
FIG. 10 is a schematic diagram of scene elements of various element types according to an embodiment.
Figure 11:
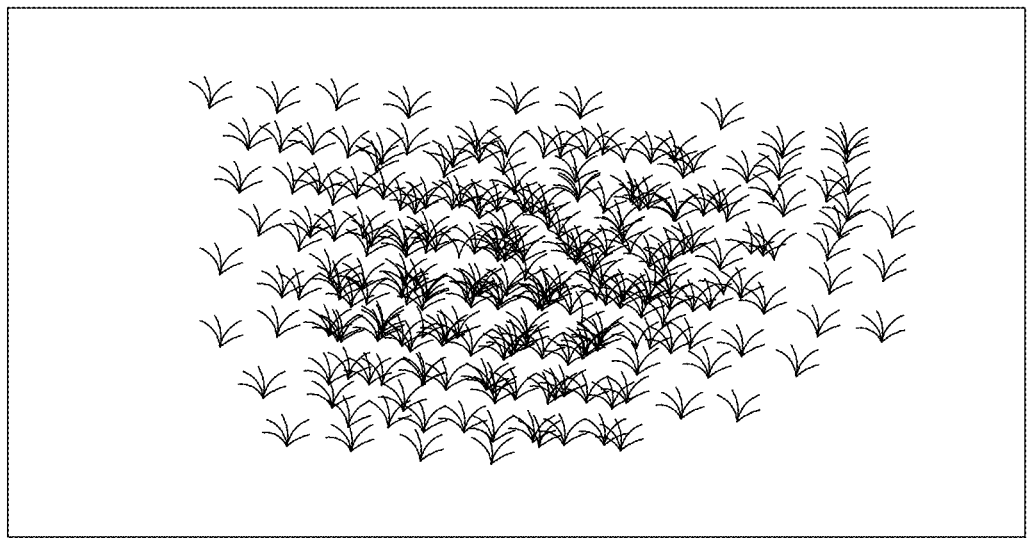
FIG. 11 is a schematic diagram of rendering and generation effects of scene elements according to an embodiment.

In an embodiment, as shown in FIG. 10, this application may provide scene elements of eight element types, namely, an element type 1 to an element type 8. As shown in FIG. 11, if the element type 3 in FIG. 10 is selected, the terminal may perform rendering to generate a scene element belonging to the element type 3 in the target region. It can be seen from FIG. 11 that the distribution of scene elements in the target region may be dense in the middle and sparse on the two sides, which avoids a monotonously repeated distribution of the generated scene elements, so that the scene elements can be better integrated into the virtual scene.

In an embodiment, the virtual scene is a virtual game scene; the target region includes a virtual land block in the virtual game scene; the scene element includes a virtual plant in the virtual game scene; and the scene element density distribution information is used for indicating a distribution of at least one to-be-generated virtual plant in the virtual land block.

Specifically, the terminal may display a virtual land block on which scene element rendering processing is to be performed in the virtual game scene, and acquire scene element density distribution information corresponding to the virtual land block in response to a scene element update operation on the virtual land block, the scene element density distribution information being used for indicating a distribution of at least one to-be-generated virtual plant in the virtual land block. The terminal may determine element density values corresponding to candidate positions in the virtual land block based on the scene element density distribution information. Further, the terminal may determine an element generation position from the candidate positions based on the element density values, and perform rendering to generate a corresponding virtual plant at the element generation position. It may be understood that, the foregoing element type may be a plant type of the virtual plant.

In the foregoing embodiments, by applying the scene element processing method of this application to the virtual game scene, the virtual plants in the virtual game scene can be better integrated into the virtual game scene.

Figure 12:
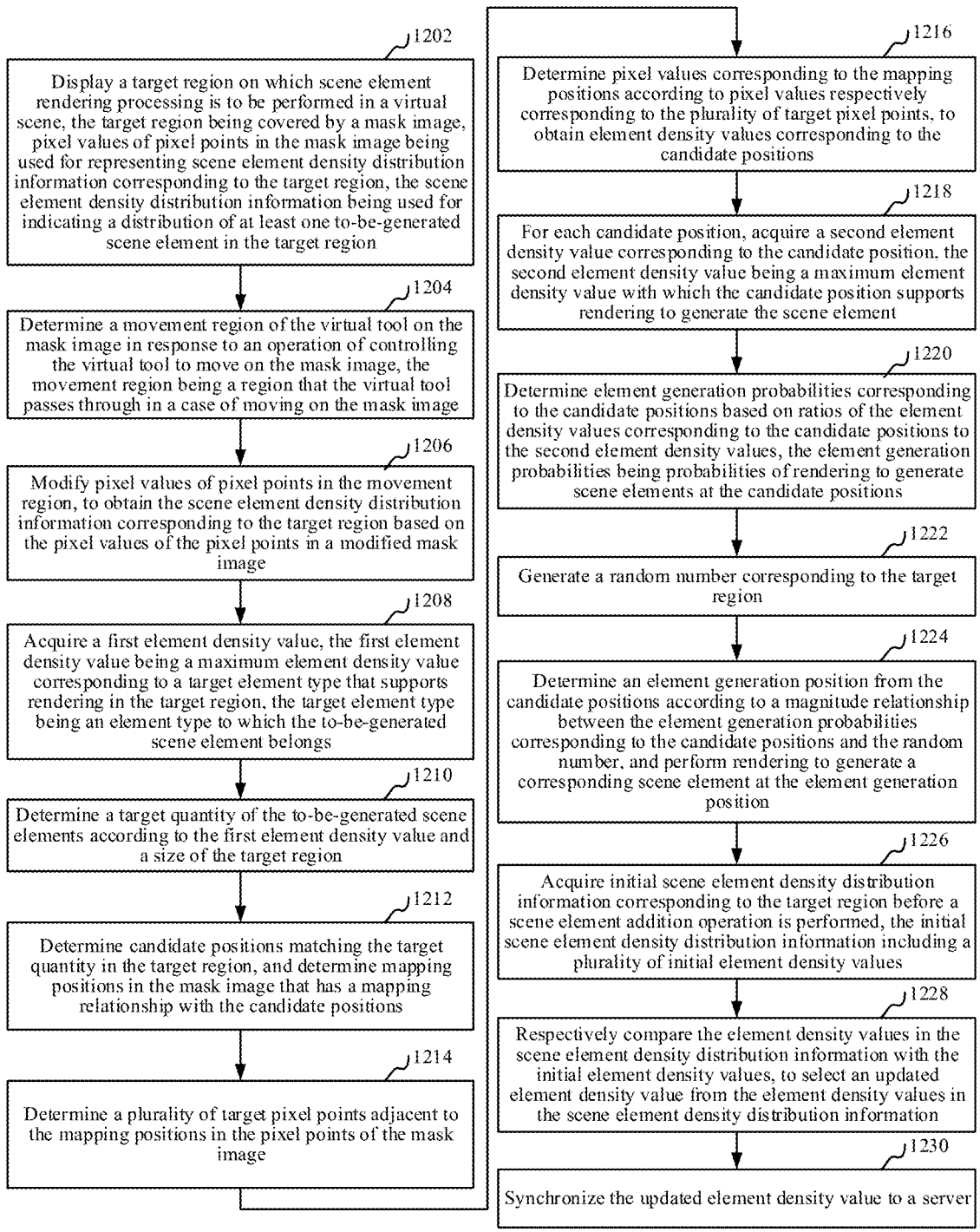
FIG. 12 is a schematic flowchart of a scene element processing method according to another embodiment.

As shown in FIG. 12, in an embodiment, a scene element processing method is provided. The method may be applied to the terminal 102 in FIG. 1, and is independently performed by the terminal 102, or may be implemented through interaction between the terminal 102 and the server 104. The method specifically includes the following steps:

Step 1202: Display a target region on which scene element rendering processing is to be performed in a virtual scene, the target region being covered by a mask image, pixel values of pixel points in the mask image being used for representing scene element density distribution information corresponding to the target region, the scene element density distribution information being used for indicating a distribution of at least one to-be-generated scene element in the target region.

Step 1204: Determine a movement region of the virtual tool on the mask image in response to an operation of controlling the virtual tool to move on the mask image, the movement region being a region that the virtual tool passes through when moving on the mask image.

Step 1206: Modify pixel values of pixel points in the movement region, to obtain the scene element density distribution information corresponding to the target region based on the pixel values of the pixel points in a modified mask image.

In an embodiment, the target region is covered by at least one mask image; the target region supports rendering to generate a scene element of at least one element type; a quantity of mask images covering on the target region is the same as a quantity of element types supported by the target region; and one mask image corresponds to one element type.

Step 1208: Acquire a first element density value, the first element density value being a maximum element density value corresponding to a target scene element type that supports rendering in the target region, the target scene element type being an element type to which the to-be-generated scene element belongs.

Step 1210: Determine a target quantity of the scene elements according to the first element density value and a size of the target region.

Step 1212: Determine candidate positions matching the target quantity in the target region, and determine mapping positions in the mask image that has a mapping relationship with the candidate positions.

Step 1214: Determine a plurality of target pixel points adjacent to the mapping positions in the pixel points of the mask image.

Step 1216: Determine pixel values corresponding to the mapping positions according to pixel values respectively corresponding to the plurality of target pixel points, to obtain element density values corresponding to the candidate positions.

Step 1218: For each candidate position, acquire a second element density value corresponding to the candidate position, the second element density value being a maximum element density value with which the candidate position supports rendering to generate the scene element.

Step 1220: Determine element generation probabilities corresponding to the candidate positions based on ratios of the element density values corresponding to the candidate positions to the second element density values, the element generation probabilities being probabilities of rendering to generate scene elements at the candidate positions.

Step 1222: Generate a random number corresponding to the target region.

Step 1224: Determine an element generation position from the candidate positions according to a magnitude relationship between the element generation probabilities corresponding to the candidate positions and the random number, and perform rendering to generate a corresponding scene element at the element generation position.

Step 1226: Acquire initial scene element density distribution information corresponding to the target region before a scene element update operation is performed, the initial scene element density distribution information including a plurality of initial element density values.

Step 1228: Respectively compare the element density values in the scene element density distribution information with the initial element density values, to select an updated element density value from the element density values in the scene element density distribution information.

Step 1230: Synchronize the updated element density value to a server.

This application further provides an application scenario, and the application scenario is applied to the foregoing scene element processing method. Specifically, the scene element processing method may be applied to a virtual plant generation scene in a game. A terminal may display a virtual land block on which scene element rendering processing is to be performed in a virtual game scene, the virtual land block being covered by a mask image, pixel values of pixel points in the mask image being used for representing scene element density distribution information corresponding to the virtual land block, the scene element density distribution information being used for indicating a distribution of at least one to-be-generated virtual plant in the virtual land block. A movement region of the virtual tool on the mask image is determined in response to an operation of controlling the virtual tool to move on the mask image, the movement region being a region that the virtual tool passes through when moving on the mask image. Pixel values of pixel points in the movement region are modified, to obtain the scene element density distribution information corresponding to the virtual land block based on the pixel values of the pixel points in a modified mask image.

The virtual land block may be covered by at least one mask image; the virtual land block may support rendering to generate a virtual plant of at least one element type; a quantity of mask images covering on the virtual land block is the same as a quantity of element types supported by the virtual land block; and one mask image corresponds to one element type.

The terminal may acquire a first element density value, the first element density value being a maximum element density value corresponding to a target scene element type that supports rendering in the virtual land block, the target scene element type being an element type to which the to-be-generated virtual plant belongs. A target quantity of the to-be-generated virtual plants is determined according to the first element density value and a size of the virtual land block. Candidate positions matching the target quantity in the virtual land block are determined, and mapping positions in the mask image that has a mapping relationship with the candidate positions are determined. A plurality of target pixel points adjacent to the mapping positions are determined in the pixel points of the mask image. A pixel value corresponding to the mapping position is determined according to pixel values respectively corresponding to the plurality of target pixel points, to obtain the element density value corresponding to the candidate position.

For each candidate position, the terminal may acquire a second element density value corresponding to the candidate position, the second element density value being a maximum element density value with which the candidate position supports rendering to generate the virtual plant. Element generation probabilities corresponding to the candidate positions are determined based on ratios of the element density values corresponding to the candidate positions to the second element density values, the element generation probabilities being probabilities of rendering to generate virtual plants at the candidate positions. A random number corresponding to the virtual land block is generated. An element generation position is determined from the candidate positions according to a magnitude relationship between the element generation probabilities corresponding to the candidate positions and the random number, and rendering is performed to generate a corresponding virtual plant at the element generation position.

The terminal may acquire initial scene element density distribution information corresponding to the virtual land block before a scene element update operation is performed, the initial scene element density distribution information including a plurality of initial element density values. The element density values in the scene element density distribution information are respectively compared with the initial element density values, to select an updated element density value from the element density values in the scene element density distribution information. The updated element density value is synchronized to a server.

For example, the scene element processing method of this application may be applied to a multi-player online role-playing game. It may be understood that, a home system entrance may be provided in the multi-player online role-playing game. Through the home system entrance, a player can enter the home system and edit the mask image covering on the virtual land block through a virtual tool in the home system, to change the element density value of the to-be-generated virtual plants, so that the virtual plants can be planted on the virtual land block. By modifying the element density value of the to-be-generated virtual plants in the virtual land block, the monotonously repeated distribution of the generated virtual plants can be avoided, so that the virtual plants can be better integrated into the game scene in the home system, thereby improving the rendering effects.

This application further provides an application scenario, and the foregoing scene element processing method is applied to the application scenario. Specifically, the scene element processing method may be applied to a virtual character generation scene in a game or a virtual animal generation scene in a game. It may be understood that, the scene element processing method may also be applied to virtual element (that is, scene element) generation scenes such as visual design and virtual reality (VR). It may be understood that, the virtual elements may include one of virtual plants, virtual characters, virtual animals, or virtual props. For example, in a VR scene, based on the scene element processing method of this application, rendering can be performed in a target region of the VR scene to generate corresponding virtual elements, so that the virtual elements can be better integrated into the VR scene. It may be understood that, the scene element processing method of this application may also be applied to application scenarios in industrial designs. For example, the scene element processing method of this application may be applied to generation of scene elements such as virtual buildings in batches in industrial design software. Based on the scene element processing method of this application, rendering can be performed in a target region of the industrial design scene to generate corresponding virtual buildings, so that the virtual buildings are better integrated into the industrial design scene, thereby effectively assisting the industrial design and meeting relatively complex requirements of the industrial design.

It is to be understood that although the steps in the flowcharts of the foregoing embodiments are displayed sequentially according to a sequence, these steps are not necessarily performed sequentially according to a sequence. Unless explicitly specified in this specification, execution of the steps is not strictly limited in the sequence, and the steps may be performed in other sequences. In addition, at least some of the steps in the foregoing embodiments may include a plurality of substeps or a plurality of stages. These substeps or stages are not necessarily performed and completed at the same moment, and may be performed at different moments. Besides, the substeps or stages may not be necessarily performed sequentially, and may be performed in turn or alternately with other steps or at least some of substeps or stages of other steps.

Figure 13:
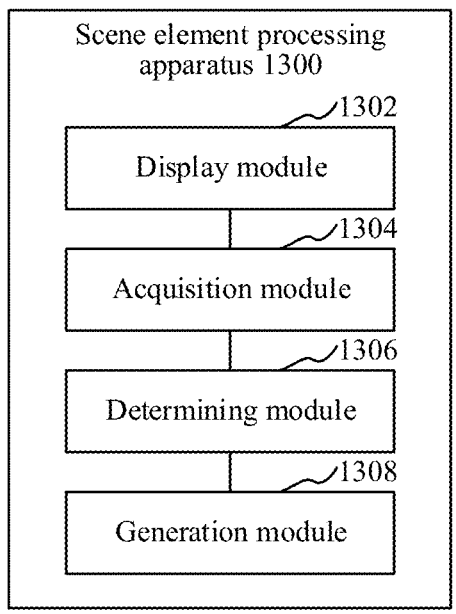
FIG. 13 is a structural block diagram of a scene element processing apparatus according to an embodiment.

In an embodiment, as shown in FIG. 13, a scene element processing apparatus 1300 is provided. The apparatus may use a software module, a hardware module, or a combination of a software module and a hardware module and become a part of a computer device. The apparatus specifically includes:

a display module 1302, configured to display a target region on which scene element rendering processing is to be performed in a virtual scene;

an acquisition module 1304, configured to acquire scene element density distribution information corresponding to the target region in response to a scene element update operation on the target region, the scene element density distribution information being used for indicating a distribution of at least one to-be-generated scene element in the target region;

a determining module 1306, configured to determine element density values corresponding to candidate positions in the target region based on the scene element density distribution information; and a generation module 1308, configured to determine an element generation position from the candidate positions based on the element density values, and perform rendering to generate a corresponding scene element at the element generation position.

In an embodiment, the target region is covered by a mask image; pixel values of pixel points in the mask image are used for representing the scene element density distribution information; and the scene element update operation includes a pixel value modification operation, the pixel value modification operation being used for modifying a pixel value of a pixel point in the mask image; and the acquisition module 1304 is further configured to update the pixel value of the pixel point in the mask image in response to the pixel value modification operation on the mask image covering on the target region, to obtain the scene element density distribution information corresponding to the target region.

In an embodiment, the target region is covered by at least one mask image; the target region supports rendering to generate a scene element of at least one element type; a quantity of mask images covering on the target region is the same as a quantity of element types supported by the target region; and one mask image corresponds to one element type.

In an embodiment, the pixel value modification operation is implemented by controlling a virtual tool to move on the mask image; the acquisition module 1304 is further configured to determine a movement region of the virtual tool on the mask image in response to an operation of controlling the virtual tool to move on the mask image, the movement region being a region that the virtual tool passes through when moving on the mask image; and modify pixel values of pixel points in the movement region, to obtain the scene element density distribution information corresponding to the target region based on the pixel values of the pixel points in a modified mask image.

In an embodiment, the determining module 1306 is further configured to acquire a first element density value, the first element density value being a maximum element density value corresponding to a target scene element type that supports rendering in the target region, the target scene element type being an element type to which the to-be-generated scene element belongs; determine a target quantity of the scene elements according to the first element density value and a size of the target region; and determine candidate positions matching the target quantity in the target region.

In an embodiment, the target region is covered by a mask image; and pixel values of pixel points in the mask image are used for representing the scene element density distribution information; and the determining module 1306 is further configured to perform, for each candidate position in the target region, upsampling in the mask image based on the candidate position, and use a pixel value obtained through the upsampling as an element density value corresponding to the candidate position.

In an embodiment, the determining module 1306 is further configured to determine a mapping position in the mask image that has a mapping relationship with the candidate position; determine a plurality of target pixel points adjacent to the mapping position in the pixel points of the mask image; and determine a pixel value corresponding to the mapping position according to pixel values respectively corresponding to the plurality of target pixel points, to obtain the element density value corresponding to the candidate position.

In an embodiment, the generation module 1308 is further configured to respectively determine element generation probabilities corresponding to the candidate positions based on the element density values corresponding to the candidate positions, the element generation probabilities being probabilities of rendering to generate scene elements at the candidate positions; and determine the element generation position from the candidate positions according to the element generation probabilities corresponding to the candidate positions.

In an embodiment, the generation module 1308 is further configured to: for each candidate position, acquire a second element density value corresponding to the candidate position, the second element density value being a maximum element density value with which the candidate position supports rendering to generate the scene element; and determine the element generation probability corresponding to the candidate position based on a ratio of the element density value corresponding to the candidate position to the second element density value.

In an embodiment, the generation module 1308 is further configured to generate a random number corresponding to the target region; and determine the element generation position from the candidate positions according to a magnitude relationship between the element generation probabilities corresponding to the candidate positions and the random number.

In an embodiment, the scene element density distribution information corresponding to the target region includes a plurality of element density values, and the apparatus further includes: a synchronization module, configured to: acquire initial scene element density distribution information corresponding to the target region before the scene element update operation is performed, the initial scene element density distribution information including a plurality of initial element density values; respectively compare the element density values in the scene element density distribution information with the initial element density values, to select an updated element density value from the element density values in the scene element density distribution information; and synchronize the updated element density value to a server.

In an embodiment, the virtual scene is a virtual game scene; the target region includes a virtual land block in the virtual game scene; the scene element includes a virtual plant in the virtual game scene; and the scene element density distribution information is used for indicating a distribution of at least one to-be-generated virtual plant in the virtual land block.

Based on the foregoing scene element processing apparatus, by displaying the target region on which scene element rendering processing is to be performed in the virtual scene, scene element density distribution information corresponding to the target region may be acquired in response to a scene element update operation on the target region, where the scene element density distribution information may be used for indicating a distribution of at least one to-be-generated scene element in the target region. The element density values corresponding to the candidate positions in the target region may be determined based on the scene element density distribution information, then an element generation position may be determined from the candidate positions based on the element density values, and rendering is performed to generate a corresponding scene element at the element generation position. Compared with the conventional manner of generating scene elements individually or in a cell form, in the scene element processing method of this application, by performing a scene element update operation on the target region, the scene element density distribution information corresponding to the target region can be updated in a personalized manner, to increase the element density value of the to-be-generated scene element in the target region, and then the element generation position can be determined from the candidate positions in the target region based on the updated scene element density distribution information, and rendering can be performed to generate a corresponding scene element at the element generation position. In this way, by modifying the element density value of the scene elements in the target region, the monotonously repeated distribution of the generated scene elements can be avoided, so that the scene elements can be better integrated into the virtual scene, thereby improving the rendering effects.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. All or some of the modules in the foregoing scene element processing apparatus may be implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 14. The computer device includes a processor, a memory, an input/output interface, a communication interface, a display screen, and an input apparatus. The processor, the memory, and the input/output interface are connected to each other by a system bus, and the communication interface, the display unit, and the input apparatus are connected to the system bus by the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The input/output interface of the computer device is configured to exchange information between the processor and an external device. The communication interface of the computer device is configured to communicate with an external terminal in a wired or wireless manner, and the wireless manner may be implemented by using Wi-Fi, a mobile cellular network, near field communication (NFC), or other technologies. The computer-readable instructions, when executed by the processor, implement a scene element processing method. The display unit of the computer device is configured to form a visible picture, which may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 14:
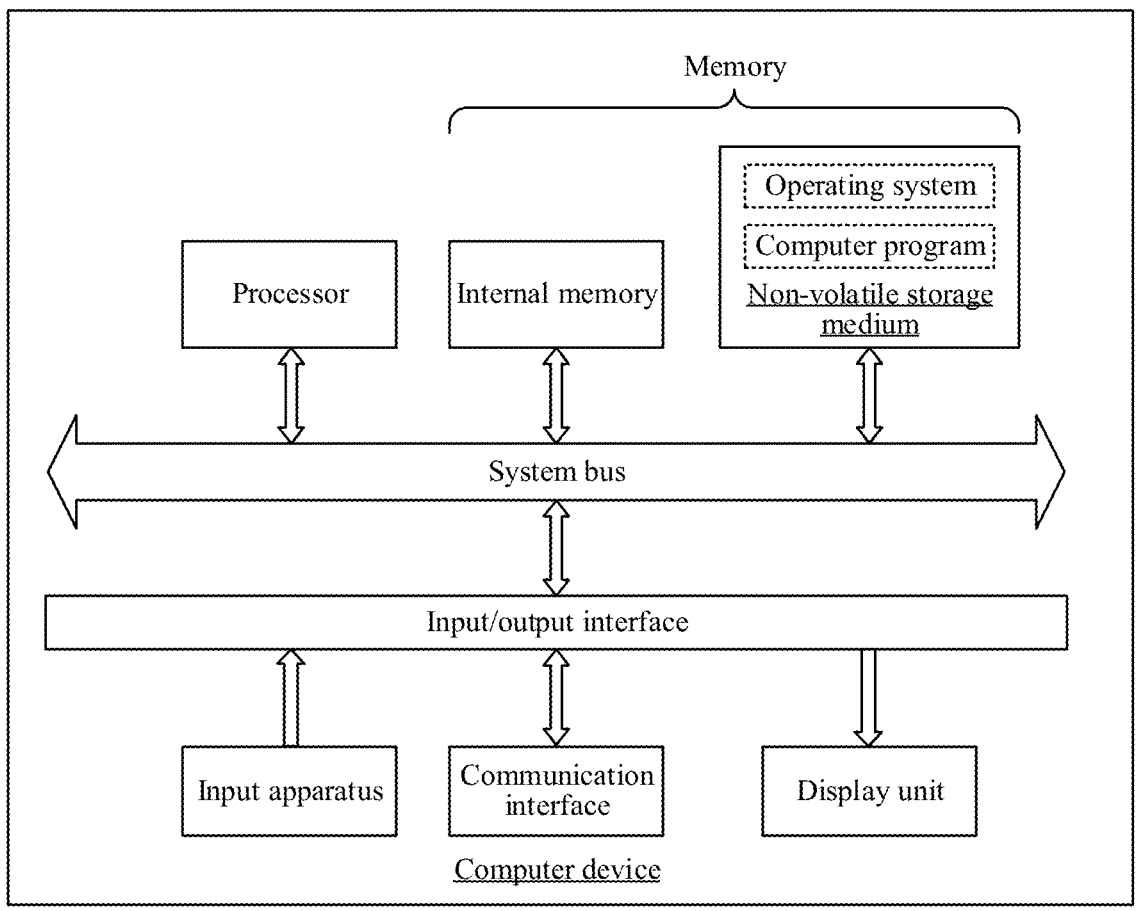
FIG. 14 is a diagram of an internal structure of a computer device according to an embodiment.

A person skilled in the art may understand that, the structure shown in FIG. 14 is only a block diagram of a partial structure related to the solution of this application, and does not limit the computer device to which the solution of this application is applied. Specifically, the specific computer device may include more components or fewer components than those shown in the figure, or some components may be combined, or a different component deployment may be used.

In an embodiment, a computer device is further provided, including one or more memories and a processor, the memory storing computer-readable instructions, the processor, when executing the computer-readable instructions, implementing the steps in the foregoing method embodiments.

In an embodiment, one or more computer-readable storage media are provided, storing computer-readable instructions, the computer-readable instructions, when executed by one or more processors, implementing the steps in the foregoing method embodiments.

In an embodiment, a computer program product is provided, including computer-readable instructions, the computer-readable instructions, when executed by one or more processors, implementing the steps in the foregoing method embodiments.

Both user information (including but not limited to user device information and user personal information) and data (including but not limited to data used for analysis, stored data, and displayed data) involved in this application are information and data authorized by the user or fully authorized by all parties, and the collection, use, and processing of relevant data need to comply with relevant laws, regulations and standards of relevant countries and regions.

A person of ordinary skill in the art may understand that all or some procedures in the method in the foregoing embodiments may be implemented by computer-readable instructions instructing related hardware. The computer-readable instructions may be stored in a non-volatile computer-readable storage medium, and when the computer-readable instructions are executed, the procedures in the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope recorded in this specification.

The foregoing embodiments only describe several implementations of this application, which are described specifically and in detail, but cannot be construed as a limitation to the patent scope of the present disclosure. For a person of ordinary skill in the art, several transformations and improvements can be made without departing from the idea of this application, which all fall within the protection scope of this application. Therefore, the protection scope of this application is subject to the protection scope of the appended claims.

What is claimed is:

1. A scene element processing method performed by a computer device, the scene element processing method comprising:
   displaying a virtual scene including a target region, wherein the target region is covered by at least one mask image;
   in response to a scene element update operation on the target region,
      generating a random number corresponding to the target region; and
      updating pixel values of pixel points in the at least one mask image covering the target region in accordance with a movement of a virtual tool on the at least one mask image, wherein the pixel values of the pixel points in the at least one mask image represent scene element density distribution information corresponding to the target region;
   determining element density values corresponding to candidate positions in the target region based on the scene element density distribution information;
   determining element generation probabilities corresponding to the candidate positions based on the element density values corresponding to the candidate positions;
   determining an element generation position from the candidate positions when an element generation probability corresponding to one of the candidate positions is greater than the random number corresponding to the target region; and
   rendering a scene element at the element generation position determined from the candidate positions based on the element density values.

2. The scene element processing method according to claim 1, wherein a quantity of mask images covering on the target region is same as a quantity of element types supported by the target region, and one of the mask images corresponding to one element type.

3. The scene element processing method according to claim 1, wherein a pixel value modification operation is implemented by controlling the virtual tool to move on the at least one mask image; and the updating the pixel values of the pixel points in the at least one mask image covering on the target region, to obtain the scene element density distribution information corresponding to the target region comprises:
   determining a movement region of the virtual tool on the at least one mask image in response to an operation of controlling the virtual tool to move on the at least one mask image, the movement region being a region that the virtual tool passes through in a case of moving on the at least one mask image; and
   modifying pixel values of pixel points in the movement region, to obtain the scene element density distribution information corresponding to the target region based on pixel values of pixel points in a modified mask image.

4. The scene element processing method according to claim 1, comprising:
   acquiring a first element density value, the first element density value being a maximum element density value corresponding to a target scene element type to be rendered in the target region;
   determining a target quantity of scene elements having the target scene element type according to the first element density value and a size of the target region; and
   determining candidate positions matching the target quantity of scene elements in the target region.

5. The scene element processing method according to claim 1, wherein the target region is covered by a mask image, pixel values of pixel points in the mask image representing the scene element density distribution information; and
   the determining the element density values corresponding to the candidate positions in the target region based on the scene element density distribution information comprises:
   performing, for each candidate position in the target region, upsampling in the mask image based on that candidate position, and using a pixel value obtained through the upsampling as an element density value corresponding to that candidate position.

6. The scene element processing method according to claim 1, wherein the element generation position is determined from the candidate positions based on the element density values by:
   comparing the element density values respectively corresponding to the candidate positions with a preset element density threshold; and
   determining a particular candidate position of which a corresponding element density value is greater than the preset element density threshold as the element generation position.

7. The scene element processing method according to claim 1, wherein the virtual scene is a virtual game scene; the target region comprises a virtual land block in the virtual game scene; the scene element comprises a virtual plant in the virtual game scene; and the scene element density distribution information indicates a distribution of at least one virtual plant in the virtual land block.

8. A computer device, comprising a memory and one or more processors, the memory storing computer-readable instructions that, when executed by the one or more processors, cause the computer device to implement a scene element processing method including:
   displaying a virtual scene including a target region, wherein the target region is covered by at least one mask image;
   in response to a scene element update operation on the target region,
      generating a random number corresponding to the target region; and
      updating pixel values of pixel points in the at least one mask image covering the target region in accordance with a movement of a virtual tool on the at least one mask image, wherein the pixel values of the pixel points in the at least one mask image represent scene element density distribution information corresponding to the target region;

determining element density values corresponding to candidate positions in the target region based on the scene element density distribution information;

determining element generation probabilities corresponding to the candidate positions based on the element density values corresponding to the candidate positions;

determining an element generation position from the candidate positions when an element generation probability corresponding to one of the candidate positions is greater than the random number corresponding to the target region; and rendering a scene element at the element generation position determined from the candidate positions based on the element density values.

9. The computer device according to claim 8, wherein a quantity of mask images covering on the target region is same as a quantity of element types supported by the target region, and one of the mask images corresponding to one element type.

10. The computer device according to claim 8, wherein a pixel value modification operation is implemented by controlling the virtual tool to move on the at least one mask image; and the updating the pixel values of the pixel points in the at least one mask image covering on the target region, to obtain the scene element density distribution information corresponding to the target region comprises:

determining a movement region of the virtual tool on the at least one mask image in response to an operation of controlling the virtual tool to move on the at least one mask image, the movement region being a region that the virtual tool passes through in a case of moving on the at least one mask image; and modifying pixel values of pixel points in the movement region, to obtain the scene element density distribution information corresponding to the target region based on pixel values of pixel points in a modified mask image.

11. The computer device according to claim 8, wherein the scene element processing method further comprises:

acquiring a first element density value, the first element density value being a maximum element density value corresponding to a target scene element type to be rendered in the target region;

determining a target quantity of scene elements having the target scene element type according to the first element density value and a size of the target region; and determining candidate positions matching the target quantity of scene elements in the target region.

12. The computer device according to claim 8, wherein the target region is covered by a mask image, pixel values of pixel points in the mask image representing the scene element density distribution information; and the determining the element density values corresponding to the candidate positions in the target region based on the scene element density distribution information comprises:

performing, for each candidate position in the target region, upsampling in the mask image based on that candidate position, and using a pixel value obtained through the upsampling as an element density value corresponding to that candidate position.

13. The computer device according to claim 8, wherein the element generation position is determined from the candidate positions based on the element density values by:

comparing the element density values respectively corresponding to the candidate positions with a preset element density threshold; and determining a particular candidate position of which a corresponding element density value is greater than the preset element density threshold as the element generation position.

14. The computer device according to claim 8, wherein the virtual scene is a virtual game scene; the target region comprises a virtual land block in the virtual game scene; the scene element comprises a virtual plant in the virtual game scene; and the scene element density distribution information indicates a distribution of at least one virtual plant in the virtual land block.

15. One or more non-transitory computer-readable storage media, storing computer-readable instructions that, when executed by one or more processors of a computer device, cause the computer device to implement a scene element processing method including:

displaying a virtual scene including a target region, wherein the target region is covered by at least one mask image;

in response to a scene element update operation on the target region, generating a random number corresponding to the target region; and updating pixel values of pixel points in the at least one mask image covering the target region in accordance with a movement of a virtual tool on the at least one mask image, wherein the pixel values of the pixel points in the at least one mask image represent scene element density distribution information corresponding to the target region;

determining element density values corresponding to candidate positions in the target region based on the scene element density distribution information;

determining element generation probabilities corresponding to the candidate positions based on the element density values corresponding to the candidate positions;

determining an element generation position from the candidate positions when an element generation probability corresponding to one of the candidate positions is greater than the random number corresponding to the target region; and rendering a scene element at the element generation position determined from the candidate positions based on the element density values.

16. The one or more non-transitory computer-readable storage media according to claim 15, wherein the scene element processing method further comprises:

acquiring a first element density value, the first element density value being a maximum element density value corresponding to a target scene element type to be rendered in the target region;

determining a target quantity of scene elements having the target scene element type according to the first element density value and a size of the target region; and determining candidate positions matching the target quantity of scene elements in the target region.

* * * * *